Sept. 20, 1971   W. J. MUELLER   3,605,620
METHOD OF MAKING RELIEF PRINTING PLATES EMPLOYING INFORMED
ABSORBING PICK SHEET
Filed Aug. 4, 1969
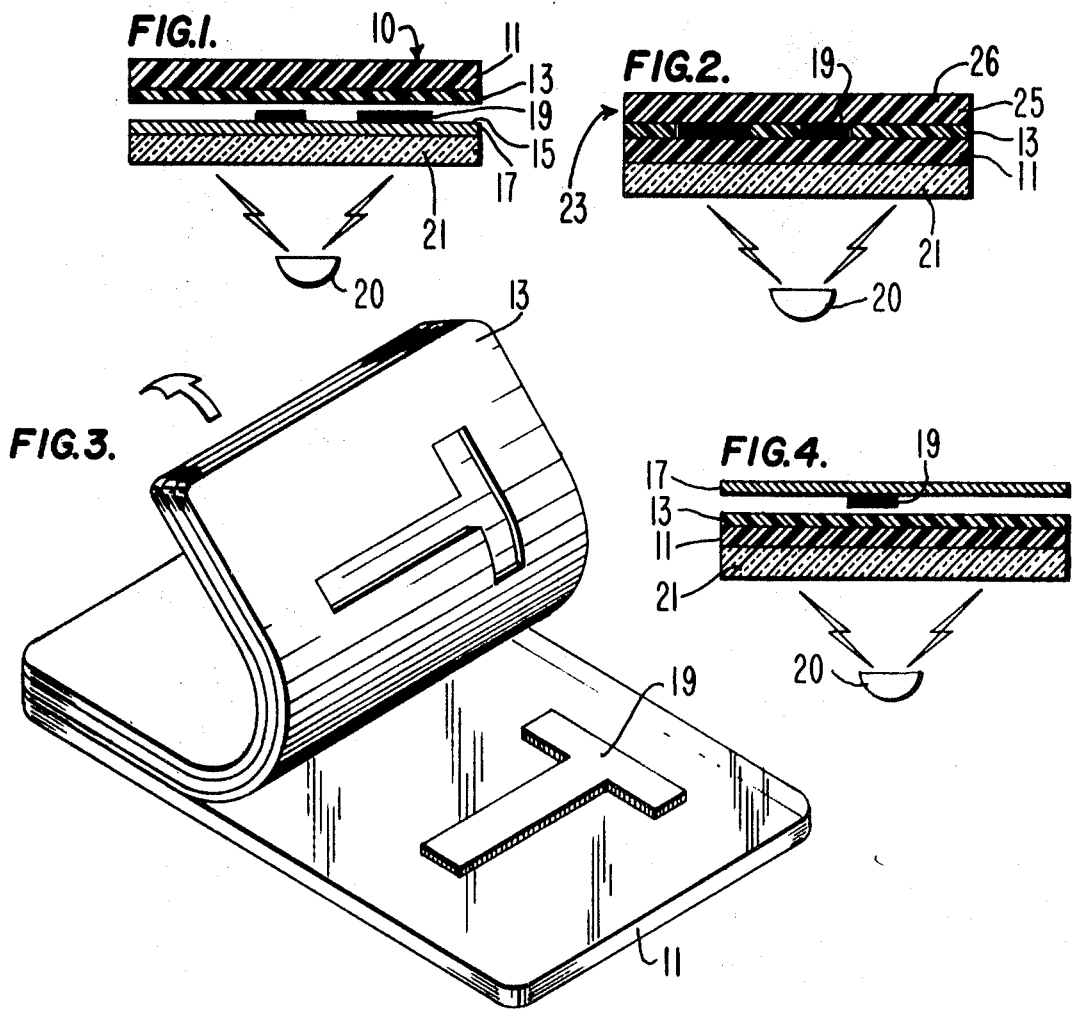
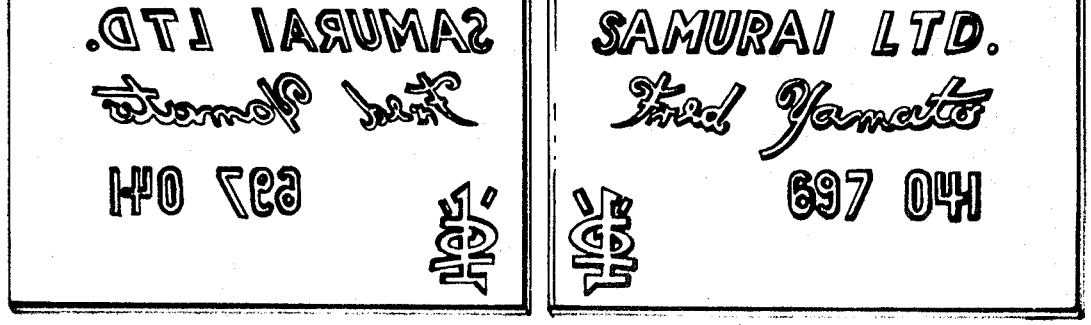
INVENTOR.
WILLIAM J. MUELLER.

United States Patent Office 3,605,620
Patented Sept. 20, 1971

3,605,620
METHOD OF MAKING RELIEF PRINTING PLATES EMPLOYING INFORMED ABSORBING PICK SHEET
William J. Mueller, Webster, N.Y., assignor to Burroughs Corporation, Detroit, Mich.
Filed Aug. 4, 1969, Ser. No. 847,149
Int. Cl. B41c 3/06; B41n 1/00
U.S. Cl. 101—401.1                               5 Claims

ABSTRACT OF THE DISCLOSURE

An improved method for processing a composing member having a heat sensitive polymer dispersion coating on a stable base such as plastic, using infrared radiation and no solvents or etchants to form a relief printing plate. Infrared absorbing indicia are placed in thermal contact with the coating and the coating is thereby selectively heated through the application of near infrared radiation. The coating, now having fused portions corresponding to the indicia, is placed in physical contact with a pick sheet and in thermal contact with a total infrared absorbing medium. The coating, the pick sheet and the total infrared absorbing medium are arranged successively outwardly from the infrared source. The previously unfused portions of the coating fuse and adhere to the pick sheet. When the pick sheet is peeled off, the previously fused portions corresponding to the indicia, remain adhered to the base to form a relief printing member. The previously unfused portions are now fused to the pick sheet and may be used as an intaglio printing member, if desired.

SUMMARY OF THE INVENTION

The preparation of printing members through the selective application of infrared heat to a thermoplastic material is known. A listing of this art, including an analysis of the most relevant U.S. patents, is presented in assignee's co-pending U.S. patent application Ser. No. 668,133, entitled "Relief Printing Member and Method of Preparing and Composing Same," filed Sept. 15, 1967.

However, the prior art involves the use of solvents or etchants to remove the unfused and soluble portions of the thermoplastic material after the selective application of infrared heat. Applicant has developed a method for removing the unfused portion of the thermoplastic material through a second application of infrared heat that completely eliminates the need for solvents.

Under applicant's inventive method the semi-processed printing member, having fused thermoplastic portions corresponding to the desired indicia, is placed with its thermoplastic face in physical contact with a stable pick sheet to which the thermoplastic material will bond during fusion under heat and in thermal contact with a totally infrared absorbent layer outwardly from the thermoplastic material. Infrared heat is applied from the side opposite the totally infrared absorbent layer. The previously unfused portions adhere to the pick sheet and are removed by peeling the pick sheet off the thermoplastic material.

BRIEF DESCRIPTION OF THE DRAWINGS

The invention will best be understood by reference to the following detailed description taken in connection with the accompanying drawings, in which:

FIG. 1 is a schematic illustration showing an arrangement of a composing member having a heat sensitive polymer dispersion layer in contact with infrared absorbing indicia during the application of near infrared radiation;

FIG. 2 is a schematic illustration showing the arrangement of the composing member having selectively fused and unfused portions in physical contact with a pick sheet and having a totally infrared absorbent layer outwardly therefrom during the second application of near infrared radiation opposite the infrared absorbent layer;

FIG. 3 is an isometric view illustrating the removing of the pick sheet following the second exposure to infrared radiation and showing the relief printing plate and the intaglio on the pick sheet;

FIG. 4 is a schematic illustration of an alternate arrangement of the elements of FIG. 1, resulting in a left to right reading printing plate;

FIG. 5 is an illustration of a left reading printing plate resulting from the arrangement of elements as in FIG. 1; and FIG. 6 is an illustration of a right reading printing plate resulting from the arrangement of element as shown in FIG. 4.

DETAILED DESCRIPTION OF THE INVENTION

Referring to FIG. 1, a latently composable relief printing member, indicated generally by the numeral 10, comprises a base sheet 11 having a coating 13 on one surface. The base plate 11 can be made of planished, smooth, or uniform caliper plastic which is preferably a plastic that is dimensionally stable over the operating temperature range of the process. Several plastic materials have been found suitable, for example:

(a) vinyl chloride-acetate copolymers with a vinyl acetate content of 5–20%,
(b) polyvinyl chloride,
(c) polyvinylidene chloride,
(d) vinylidene chloride copolymers with acrylonitrile or vinylchloride or acrylate esters,
(e) polyvinyl formal, acetal and butral,
(f) acrylate and methacrylate ester polymers,
(g) ethyl cellulose,
(h) polycarbonates,
(i) cellulose acetate-butyrate,
(j) cellulose propionate, and
(k) cellulose triacetate.

Other materials have also been found suitable such as metal, metal foil, metal foil laminated paper or board, plastic coated paper or board and plastic coated fabric. The preferred material for use as the base sheet is a non-oriented vinyl chloride homopolymer.

The base sheet can be almost any thickness, but practical limits of 0.003″ to 0.060″ are usually observed. The thickness is in part determined by the application to which the resulting printing plate is to be placed. If the plate is to be used on a press where it is supported throughout its length, the base can be relatively thin. On the other hand, if the relief printing plate is to be used as a credit card, then it should be relatively thick in order to be self-supporting and able to withstand the normal abuse to which credit cards are subjected. The base should also be resistant to dimensional distortion and absorption of materials from the coating at temperatures below the final imaging temperatures.

The heat sensitive polymer dispersion coating 13 should be as thick as the amount of relief desired in the printing plate. For most applications the coating would be within the working limits of 0.002 to 0.010 inch. The preferred coating thickness is in the range of 0.004 to 0.010 inch. The preferred coating thickness is in the range of 0.004 to 0.005 inch. The polymer dispersion is a moderately viscous non-tacky and self-leveling fluid which should be free from dust, fibers and occluded air bubbles.

The coating used in the present invention can consist of a dispersion of a solid resinous material in a mixture of solid or liquid plasticizer and a liquid polyfunctional monomer of low vapor pressure which has the ability to crosslink during polymerization. The dispersion resin should be uniformly dispersed throughout the mixture of plasticizer and liquid monomer along with a catalyst and any fillers, wetting agents and leveling agents needed to provide the rheological properties necessary for coating.

The dispersion coating undergoes distinct property changes on heating. When originally prepared for coating, the composition is a moderately viscous non-tacky liquid. After application to a base sheet and heating to a first pregelling temperature, the dispersion resin absorbs some of the liquid plasticizer and plasticizing monomer which causes the resin particles to swell and lock together forming a dry coating. On heating to a second higher temperature, the plasticizer and monomer dissolve the dispersion resin and the catalyst initiates polymerization and cross linking of the polyfunctional liquid monomer to form a solid, solvent insoluble solution.

The dispersion resins used in preparing the heat sensitive coatings of the present invention should be in a finely divided form and capable of forming stable dispersions in compatible liquid plasticizers. Resin particles between 0.1 to 10 microns are suitable with 0.5 to 1.5 microns the preferred size. The following are representative resins for use either singly or in combination in preparing the heat sensitive dispersion coatings of the present invention:

(a) polyvinyl chloride
(b) copolymers of vinyl chloride and vinylidene chloride
(c) acrylic resins
(d) polyolefins
(e) polyvinyl fluorides
(f) polyvinyl chloro fluorides
(g) vinyl chloride maleic ester copolymers
(h) copolymers of vinyl chloride and vinyl acetate The preferred resin for use in preparing the heat sensitive dispersion of the present invention is polyvinyl chloride in view of its ready availability and lost cost.

The plasticizer-monomer mixture employed in the coating composition of the present invention should have the following properties: (1) non-volatility at ambient conditions and at temperature of pregelling, (2) non-solvency for the dispersion resin at room ambient temperatures, (3) moderate solvency for the dispersion resin at selected pregelling (210°–230° F.) temperatures, (4) high solvency for the dispersion resin at high (350° F.+) temperatures, (5) non-solvency for a plastic base sheet at room temperatures, (6) high solvency for a plastic base sheet at (350° F.+) temperatures, and (7) the ability to cross link to become a solvent insoluble polymer at the higher (350° F.+) temperatures. Substitution for the monomer of a plasticizer having the first six characteristics but being unpolymerizable, will also give satisfactory results but requires considerably greater control of the composition steps in view of the small margin of difference in solvent solubility between the imaged and non-imaged areas of the unpolymerized coating.

The following are representative examples of plasticizers suitable for use in compounding the coating compositions of the present invention:

(a) Phthalate esters
  diethyl
  di n-butyl
  di isohexyl
  di 2-ethylhoxyl
  di isononyl
  di isodecyl
  di isoundecyl
  di isotridecyl
  diphenyl
  dicapryl
  di 2-propylheptyl
  dicyclohexyl
  di n-hexyl
  butyl 2-ethylhexyl
  2-ethylhexyl isodecyl
  isohoxyl isodecyl
  2-methylpentyl isodecyl
  butyl cyclohexyl
  butyl benzyl
  n-octyl n-decyl
(b) Isophthalate esters
  di 2-ethylhexyl
  di isodecyl
  di isononyl
  butyl 2-ethylhexyl
  2-ethylhexyl isodecyl
(c) Terephthalate esters
  2-ethylhexyl
(d) Adipate esters
  di isodecyl
  di 2-ethylhexyl
  di isononyl
  dioctyl
(e) Azelate esters
  di 2-ethylhexyl
  dioctyl
(f) Sebacate esters
  dibencyl
  di 2-ethylhexyl
  butyl
  dioctyl
(g) Phosphate esters
  tricresyl
  cresyl diphenyl
  2-ethylhexyl diphenyl
  didecyl cresyl
  di-2-ethylhexyl phenyl
  tri-2-ethylhexyl
  tri-n-butyl
  triphenyl
(h) Dibenzoate esters
  diethylene glycol
  dipropylene glycol
  polyethylene glycol
  octylene glycol
  3-methyl-1,5-pentanediol
(i) Citrate esters
  acetyl tributyl
  acetyl tri-2-ethylhexyl
(j) Glycol esters
  triethylene glycol dihexoate
  triethylene glycol di-2-ethylhexoate
  polyethylene glycol di-2-ethylhexoate
  diethylene glycol dipelargonate
(k) Epoxidized soybean oil The plasticizers can be used singly or mixtures of the plasticizers can be used to produce particular properties.

The polymerizable monomer used in the coating composition should be a polyfunctional monomeric liquid of low vapor pressure having the ability to cross link during polymerization under the influence of catalysis initiated by heat. The following materials are representative examples of suitable liquid monomers:

(a) 1,3 butylene glycol dimethacrylate
(b) trimethylol propane trimethacrylate
(c) ethylene glycol dimethacrylate
(d) triethylene glycol dimethacrylate
(e) tetraethylene glycol dimethacrylate
(f) diallyl phthalate
(g) diallyl fumarate
(h) 1,4 butane diol diacrylate
(i) 1,4 butane diol dimethacrylate
(j) 1,3 butylene glycol diacrylate
(k) cyclohexyl acrylate
(l) 1,10 decamethylene glycol dimethacrylate
(m) diethylene glycol diacrylate (n) diethylene glycol dimethacrylate
(o) 2,2 dimethyl propane diacrylate
(p) 2,2 dimethyl propane dimethacrylate
(q) glyceryl trimethacrylate
(r) 1,6 hexane diol diacrylate
(s) 1,6 hexane diol dimethacrylate
(t) neopentyl glycol diacrylate
(u) neopentyl glycol dimethacrylate
(v) polyethylene glycol (200) diacrylate
(w) tetraethylene glycol diacrylate
(x) triethylene glycol diacrylate
(y) 2,2,4 trimethyl-1,3-pentane diol dimethacrylate
(z) trimethylol ethane trimethacrylate
(aa) trimethylol propane triacrylate
(bb) tripropylene glycol dimethacrylate The following can also be used as polymerizable plasticizer monomers but their polymerized structure is linear and exhibits solubility in contrast to the cross-linked polymers:

(a) dodecyl methacrylate
(b) lauryl methacrylate
(c) stearyl methacrylate
(d) butyl cellosolve acrylate
(e) n-decyl acrylate
(f) n-decyl methacrylate
(g) 2-ethoxyethyl methacrylate
(h) 2-ethyl hexyl methacrylate
(i) isononyl methacrylate
(j) octadecyl acrylate
(k) oleyl methacrylate
(l) tetrahydropyranyl methacrylate
(m) tridecyl methacrylate
(n) 3,5,5 trimethyl hexyl methacrylate
(o) 2,2,4-trimethyl pentane diol isobutyrate, 3-methacrylate These, however, can be mixed with the polyfunctional monomers to give copolymers which are insoluble.

Along with the dispersion resin and plasticizers and monomer, other ingredients such as catalysts, fillers and leveling and wetting agents can be added to the coating composition. Organic peroxide type catalysts, for example, benzoyl peroxide and t-butyl peroxide and t-butyl perbenzoate are preferred for use in the coating composition in view of their ease of handling and ready availability.

Fillers such as amorphous silica and barium sulfate can be used to add firmness or body to the coating. Wetting agents such as the polyethylene glycol oleates and laurates and leveling agents such as lecithin and nonionic surfactants such as Tenlo-70, which is sold by the Nopco Chemical Co., of Newark, New Jersey, can be added if desired and as known in the art to improve the coating and leveling properties of the dispersion coating.

The following are examples of polymerizable coating compositions suitable for use in preparing the latently composable relief printing members of the present invention. The compositions are expressed in weight percent.

EXAMPLE 1

| | Percent |
|---|---|
| Polyvinyl chloride resin [1] or | 49.25 |
| Trimethylol propane trimethacrylate | 30.00 |
| t-Butyl perbenzoate | 00.45 |
| Barium sulfate | 10.00 |
| Diphenyl phthalate | 10.00 |
| Nionionic surfactant | 00.30 |

[1] Other compatible dispersion resins, as previously listed, can be substituted.

In preparing this composition, the diphenyl phthalate is melted and added to the trimethylol propane trimethacrylate with stirring. The t-butyl perbenzoate is then added along with the dispersion resin, the barium sulfate, and the surfactant. The mix is then passed through a three-roll paint mill to remove entrapped air and to break up any agglomerates of resin and barium sulfate. The resulting liquid is a stable dispersion of resin in a liquid plasticizer and liquid monomer.

EXAMPLE 2

| | Percent |
|---|---|
| Vinyl chloride resin [1] | 53.80 |
| Triphenyl phosphate | 11.30 |
| Dipropylene glycol dibenzoate | 4.00 |
| 1,3 butylene glycol dimethacrylate | 30.00 |
| Polyethylene glycol oleate | 0.30 |
| Lecithin | 0.30 |
| t-Butyl perbenzoate | 0.30 |

[1] Other compatible dispersion resins, as previously listed, can be substituted.

In preparing the coating composition, the triphenyl phosphate is melted and then poured with stirring into a container holding a mixture of liquid dipropylene glycol dibenzoate and liquid 1,3 butylene glycol dimethacrylate. The solution is quite viscous so a stirrer should be used that is strong enough to smoothly and thoroughly mix the ingredients without beating or vortexing, which would cause undesired inclusion of air. The remaining ingredients are then added with stirring and mixed. The mixture should then be passed through a three-roll ink mill to break up any agglomerates in the dispersion resin and to remove any air incorporated during the original mixing. The resulting liquid is a stable dispersion of resin in a liquid plasticizer and liquid monomer.

EXAMPLE 3

| | Percent |
|---|---|
| Vinyl chloride resin [1] | 44.25 |
| Octyl diphenyl phosphate | 8.50 |
| Trimethylol propane triacrylate | 26.50 |
| Tenlo-70 | 0.30 |
| t-Butyl peroxide | 9.45 |
| Barium sulfate | 20.00 |

[1] Other compatible dispersion resins, as previously listed, can be substituted.

Since no solid plasticizer is employed in this example, the liquid materials should be added together and thoroughly mixed. The dispersion resin and inorganic filler are then added with mixing. The dispersion is then passed through a three-roll ink mill to break up any agglomerates of resin and barium sulfate and to remove entrapped air to yield a stable liquid dispersion.

EXAMPLE 4

| | Percent |
|---|---|
| Vinyl chloride resin [1] | 50.0 |
| Ethylene glycol dimethacrylate | 51.2 |
| Polyethylene glycol laurate | 0.3 |
| Lecithin | 0.4 |
| Benzoyl peroxide | 0.5 |

[1] Other compatible dispersion resins, as previously listed, can be substituted.

The several ingredients are mixed as in Example 2 and passed through a three-roll ink mill in order to break up any agglomerates and to deaerate the mixture. In this example, as in all the other examples, precautions should be taken against undue air inclusion during the mixing operation. Occluded air can be essentially removed by allowing it to rise to the surface over a period of 1-2 days and drawing the mix off from the bottom for the milling operation. Vacuum deaeration may also be used.

Depending upon the resin used, and the plasticizing effect of the solid plasticizer employed, the proportion of the monomer may be drastically reduced. It is feasible to provide a coating which has no monomer present at all:

EXAMPLE 5

| | Percent |
|---|---|
| Vinyl chloride dispersion resin | 51.00 |
| Di octyl phthalate | 30.60 |
| Tenlo-70 (leveling agent) | .24 |
| Ferro 6V6A (stabilizer) | 1.46 |
| Barium sulfate (filler) | 16.70 |
| | 100.00 |

The ingredients are mixed by being passed through a three-roll ink mill as set forth above with respect to Examples 2 and 4.

After the dispersion composition has been prepared, it is best coated on the base sheet, for example, a vinyl substrate, at a uniform thickness between 0.002 and 0.010 inch and then heated in a hot air oven at a temperature of from 105°–110° C. for 15–20 seconds. Upon heating for this short time, the dispersion resin absorbs the monomer and plasticizer to produce a dry, gelled film but does not dissolve in the plasticizer-monomer mixture, nor does any polymerization take place, nor is the vinyl chloride substrate dissolved or solvated. The coated product at this point is clean to handle and shows no signs of age deterioration.

In order to avoid having relief characters of different heights, it is essential that the vinyl base be of relatively uniform caliper, preferably within ±0.0005″. The coating should also be carefully applied to the base within ±0.0002 inch. The coating may be applied by means of a reverse roll coater, a knife over roll coater, a knife over flat bed coater or by extrusion.

Referring again to FIG. 1, the latently composable relief printing member 10 is shown in surface contact with a master sheet 15 which comprises a translucent support 17 having near infrared absorbent indicia 19 on the surface thereof. A schematic source of near infrared radiation for use in irradiating the assembled sheets is shown at 20. The sizes of the several sheets and indicia have been greatly exaggerated in order to facilitate illustration of each element. The master sheet 15 is positioned opposite the relief printing member 10 with the indicia 19 in direct contact with the dispersion coating 13. This orientation of the sheets is preferred, but the order of the sheets and the orientation of the coatings can be varied if corresponding adjustments are made in the process steps.

The sheets are assembled on any convenient support, as represented at 21, suitable for the application of infrared heat therethrough.

The support sheet 17 can be paper upon which the data to be composed 19 is typed or written using carbon or other near infrared absorbing media. The support thickness should not exceed 0.003 inch for best results and preferably 0.002 inch. Although the infrared radiations must penetrate the body of the paper, in the preferred orientation of the relief printing member 10 and master sheet 15, the paper can contain up to 15% filler without undue impairment of its functionality.

Paper translucency is commercially achieved by (a) pulp selection, (b) avoiding excessive filler or pigment loading, (c) pulp hydration, and (d) resin impregnation. Any one or all of these variables may be used to obtain a desirable degree of translucency, i.e., less than 85% opacity as measured by a Photovolt Opacimeter, manufactured by the Photovolt Corporation of New York, N.Y. Thicker papers up to 0.007 inch with high degrees of translucency (65% opacity), and opaque papers (90% opacity) which are less than 0.002 inch thick will work but 0.0015 to 0.003 inch caliper at 50–85% opacity are the desirable ranges.

In addition to the above requirements, the paper surface should be level and smooth and of high porosity and accept typing from inked and coated ribbons as well as pencil writing.

After placing the latently composable relief printing member 10 and the master sheet 15, which contains data to be composed, in surface contact, the combined sheets should be exposed to a source of near infrared radiation 20 (7,500 to 30,000 angstrom units or preferably 8,000 to 18,000 angstroms) for approximately 54 seconds. A high intensity source of near infrared radiation is preferred in order to reduce exposure time to a minimum. Quartz tube lamps, for example, the General Electric T–2½ and T–3, can be operated to produce a broad range of infrared concentration from 100 watts per linear to 400 watts with the near infrared energy concentration increasing with increasing wattage.

In determining the length of exposure time it is best to employ the highest energy source available in order to reduce extraneous heating of the printing member 10. Since in the quartz tube lamp the near infrared energy concentration is proportional to the filament temperature, the quartz envelope itself gets hotter as the amount of near infrared radiation increases and heat conducted through the air can become sufficient to tend to cure the non-imaged areas on the printing member. In exposing apparatus employing the General Electric T–2½ lamp, for example, the Thermofax units sold by Minnesota Mining and Manufacturing and the General Electric T–3 lamp in the Masterfax units sold by Ditto Incorporated, a time of 50 to 60 seconds appears to be sufficient. Each of the aforementioned units employ a quartz tube lamp with voltages boosted above line to increase the energy output.

Following the infrared exposure of the master sheet 15 and relief printing member 10, the sheets should be separated and the master sheet 15 removed.

The semiprocessed relief printing plate 10 now has fused portions in its plastisol layer corresponding to the indicia on the master sheet 15. Such a semiprocessed relief printing plate is known in the prior art. From this semiprocessed plate the unfused portions of the plastisol layer must be removed to form the finished printing plate.

In the prior art it has been necessary to remove the unfused plastisol by solvents. Such a chemical process requires not only the availability of chemical solvents but also facilities for applying the solvent and facilities for flushing away the residue. There is also the ever-present possibility that chemical solvents may splash on the clothing of the operator. Under applicant's method, all these difficulties are removed.

A totally infrared absorbing medium, including a pick sheet to which the unfused plastisol will fuse under heat, is placed in physical contact with the thermoplastic layer. Near infrared radiation is applied to the semiprocessed printing plate from the side opposite the totally infrared absorbing medium. The extraneous plastisol can then be removed by peeling away the pick sheet.

Referring now to FIG. 2, the semiprocessed printing plate is shown with its base sheet 11 resting on the support 21.

In the preferred embodiment of the totally absorbing infrared medium a calendered .010″ polyvinyl chloride sheet 25 is coated with a carbon black or graphite layer 26.

Alternatively, a sheet of black paper or carbon paper can be used with an uncoated planished vinyl sheet. Instead of a relatively thick single sheet of vinyl, two thinner sheets were also juxtaposed with satisfactory results.

When infrared heat is applied from the direction of the support 21, the sandwich of layers heat backwardly from the totally infrared absorbing layer 26 and the unfused plastisol in the layer 13 fuses to the sheet 25. The previously fused imaged portions are further hardened increasing their tensile strength.

When using a pick sheet of .010″ polyvinyl chloride infrared energy was applied for 25–30 seconds to the semiprocessed printing plate. The period of second exposure to the infrared source would, of course, be adjusted as required by strength of the source, thickness of the layers, etc.

As shown in FIG. 3, the polyvinyl chloride sheet, now having the previously unfused plastisol fused to it, is peeled away. The originally imaged areas now form with the base an integral relief printing plate which may be used for office purposes, or as the printing element of a credit card.

The peeled away sheet 25 also can be used as a printing member since the plastisol portions now fused to it form an intaglio surface exactly complementing the relief printing member.

In FIG. 4, the elements of FIG. 1 have been rearranged for use in preparing a right to left reading printing plate as known in the art. After the original application of infrared radiation, the semiprocessed printing plate is further processed exactly as explained above.

The resulting printing plates, as illustrated in FIGS. 5 and 6, can be used in a simple letter press and have been found particularly useful as printing plates in the preparation of individualized checks.

The preferred embodiment as set forth herein was selected for utility with readily available office thermal copying machines. With such customarily available equipment a printing plate can be made by untrained office personnel in two to three minutes. No further apparatus and no chemicals are necessary.

It is apparent that the principles of applicant's method are applicable to the removal of unfused portions of a plastisol layer in situations other than in the preparation of a small relief printing plate as described herein. Adjustments can easily be made in dimensions of materials and infrared source exposure time to accommodate varying circumstances.

I claim:

1. A method for preparing a printing plate from a near infrared non-absorbing polymer dispersion layer which has had a printing image formed therein through the application of a heat pattern generated through the application of near infrared energy to a near infrared absorbing image in thermal contact with the near infrared non-absorbing polymer dispersion layer, the heat pattern causing the polymer dispersion to fuse in the heated areas corresponding to the image and to remain unfused in the unheated areas, comprising the following steps:

(a) placing a totally infrared absorbing medium having a surface with affinity for thermal fusion with the unfused portion of the polymer dispersion layer in intimate physical contact therewith, (b) fusing the previously unfused portions of the polymer dispersion layer to the surface of the medium by application of infrared energy through the layer and toward the totally infrared absorbing medium, and (c) peeling the medium having the previously unfused portions now fused thereto, away from the layer.

2. The method of claim 1 wherein said totally infrared absorbing medium comprises a polyvinyl chloride sheet having a coating of carbon black.

3. The method of claim 1 wherein said totally infrared absorbing medium comprises a polyvinyl chloride sheet and a juxtaposed sheet of black paper.

4. The method of claim 1 wherein said totally infrared absorbing medium comprises a polyvinyl chloride sheet having a coating of graphite.

5. The method of claim 1 wherein said totally infrared absorbing medium comprises a polyvinyl chloride sheet and a juxtaposed sheet of carbon paper.

References Cited

UNITED STATES PATENTS

| | | | |
|---|---|---|---|
| 3,264,103 | 8/1966 | Cohen | 96—35.1X |
| 3,315,598 | 4/1967 | Owen | 250—65.1X |
| 3,380,825 | 4/1968 | Webers | 96—35.1 |
| 3,395,014 | 7/1968 | Cohen | 96—35.1X |
| 3,454,765 | 7/1969 | Hochbery | 250—65.1 |
| 3,468,254 | 9/1969 | Ritzerfeld | 101—401.1 |

WILLIAM B. PENN, Primary Examiner

E. M. COVEN, Assistant Examiner

U.S. Cl. X.R.

101—463; 250—65.1

UNITED STATES PATENT OFFICE
CERTIFICATE OF CORRECTION

Patent No. 3,605,620     Dated September 20, 1971

Inventor(s) William J. Mueller

It is certified that error appears in the above-identified patent and that said Letters Patent are hereby corrected as shown below:

| In the Patent | In the Application |
|---|---|
| Col. 2, line 7, "isometic" should read --isometric--. | See specification, page 3, line 4. |
| Col. 3, line 40, "lost" should read --low--. | See specification, page 6, line 13. |
| Col. 5, line 69, "Nioionic" should read --Nonionic--. | See specification, page 12, line 3. |
| Col. 8, line 73, "chloride" should read --chloride,--. | See specification, page 19, line 5. |

Signed and sealed this 14th day of March 1972.

(SEAL)
Attest:

EDWARD M. FLETCHER, JR.
Attesting Officer

ROBERT GOTTSCHALK
Commissioner of Patents